Sept. 9, 1952　　　F. W. WHITLOCK　　　2,610,023
VALVE STRUCTURE
Filed Oct. 7, 1946　　　　　　　　　　　　3 Sheets-Sheet 2
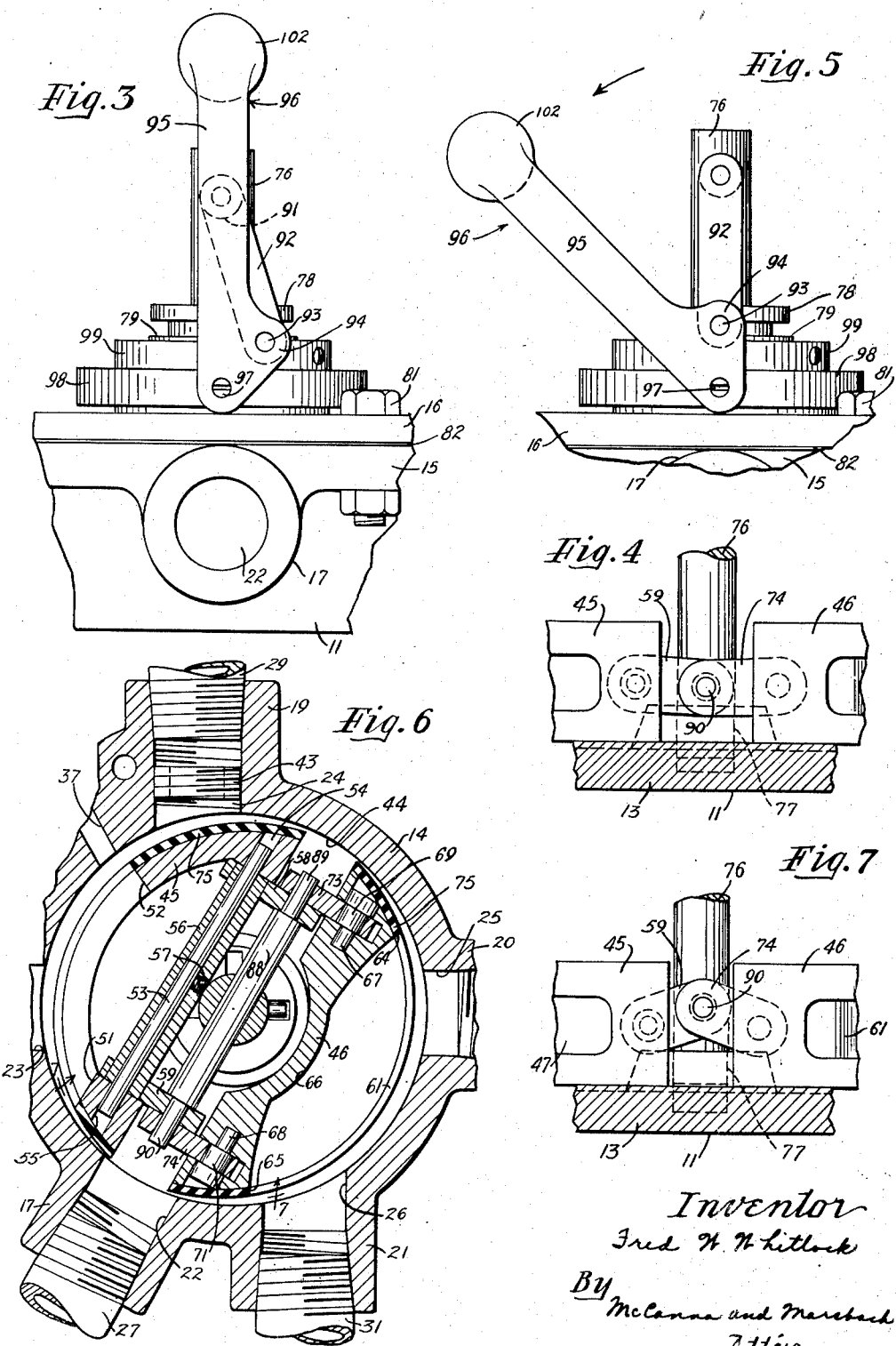
Inventor
Fred W. Whitlock
By McCanna and Marzbach
Attys.

Sept. 9, 1952     F. W. WHITLOCK     2,610,023
VALVE STRUCTURE

Filed Oct. 7, 1946     3 Sheets-Sheet 3

Inventor
Fred W. Whitlock
By McCanna and Morsbach
Attys.

Patented Sept. 9, 1952

2,610,023

UNITED STATES PATENT OFFICE 2,610,023

VALVE STRUCTURE

Fred W. Whitlock, Rockford, Ill., assignor to Automatic Pump & Softener Corporation, Rockford, Ill., a corporation of Illinois Application October 7, 1946, Serial No. 701,667

13 Claims. (Cl. 251—102)

This invention relates to valves and more especially to multi-way valves for simultaneously controlling a plurality of fluid flows in plural step operation.

Multi-way valves are well known in the art, but all of such valves with which I am familiar have one or more serious limitations and objectionable features. In certain types there is apt to be cross leakage between the ports under certain conditions, while in other constructions the pressure of the fluid on the valve renders difficult and sometimes practically impossible, movement of the valve members between their various positions. Furthermore, in some of these constructions the valve is apt to be momentarily open by surges of pressure in the pipe lines (such as that commonly known as waterhammer), thereby permitting momentary cross flow between the ports of the valve.

An important object of the present invention is the provision of a valve of the character described, in which the above-enumerated objectionable features, as well as others, common to such valves, are eliminated.

A further object of the invention is the provision of a valve of the character described having improved means for operating the valve.

I have also aimed to provide a valve of the type referred to in which the movable valve members are locked in their seated position to maintain proper seating pressure and prevent improper unseating of the valve.

A further object of the invention is to provide a valve of the character described, so constructed that the pressures on the movable valve members are balanced so that the valve may be moved from position to position by a moderate externally applied manual force and the pressures do not need to be relieved from the valve, where large valves are employed, in order to permit manual repositioning of the parts.

Another object is the provision of a valve structure of the nature described which does not require spring means for its satisfactory operation.

Other objects and advantages will appear from the following description and the accompanying drawings, in which—

Fig. 3 is a fragmentary side elevation showing the handle in the seated position of the valve;

Fig. 4 is a view taken on the line 4—4 of Fig. 2 showing the core toggles in seated position;

Fig. 5 is a view similar to Fig. 3 with the handle in the unseated position of the valve;

Fig. 6 is a fragmentary longitudinal section through the valve similar to Fig. 2 showing the core sections in unseated position;

Fig. 7 is a view somewhat similar to Fig. 4 showing the core toggles in the unseated position corresponding to the positions of the parts in Fig. 6, and Figs. 8 and 9 are views similar to Fig. 2 showing, with Fig. 2, the three operative seated positions of the valve core.

Figure 1:
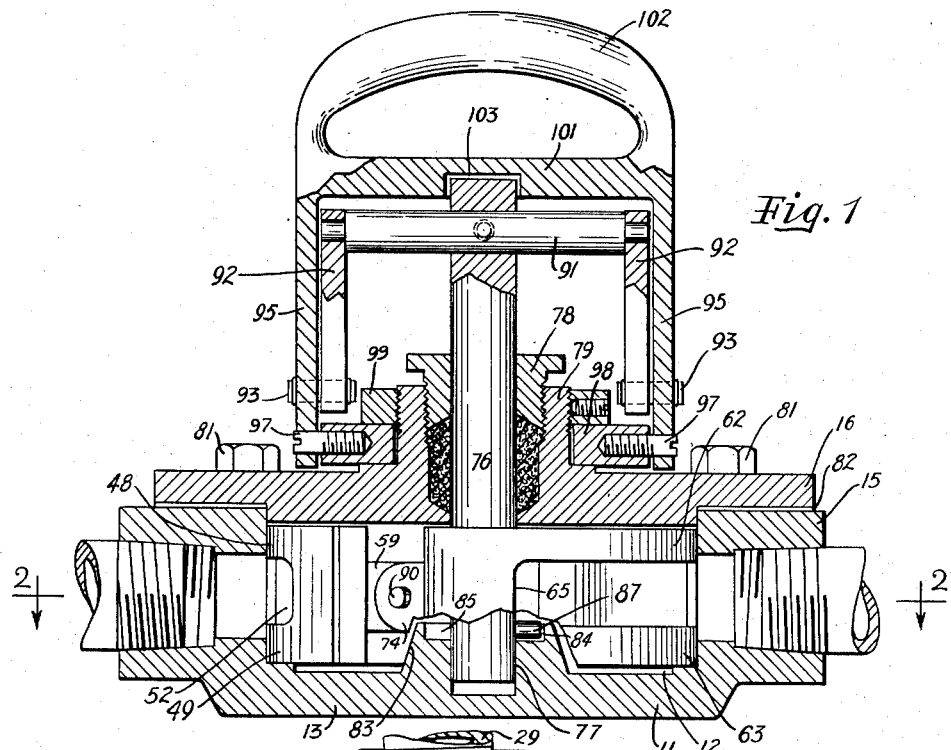
Figure 1 is a transverse section through a valve embodying my invention, some of the parts being shown in elevation.

The embodiment of the valve herein shown is designed primarily for use in water treatment and like applications to control the flow of liquid. One example of such use is in the control of the liquid flows to a water filter or a base exchange water treatment apparatus of the type having a tank for containing the base exchange material and a container for holding salt brine or other regenerating reagent which is periodically passed through the tank for the purpose of reconditioning the base exchange material. Since such base exchange apparatus is well known in the art and forms no part of the present invention, it has been deemed unnecessary to illustrate the same in the drawings.

The valve has a case comprising a body and a cap, the case being designated generally by the numeral 11 which may be formed of any suitable material, in this instance the body being cast from metal such as gray iron, brass or the like, the nature of the metal depending upon the service in which the valve is to be used, as is well understood in the art. The body has a central valve chamber 12 formed with a bottom wall 13 and upstanding side walls 14, in this instance of cylindrical configuration. A laterally disposed flange 15 is disposed at the upper edges of the walls, the upper surface of this flange presenting a plane surface for the attachment of the cap 16 presently to be more fully described. Spaced around the wall 14 are bosses 17, 18, 19, 20 and 21, which have internally threaded bores 22, 23, 24, 25 and 26 which pass through the wall 14 and terminate in ports on the inner side of the wall. Threaded into these bosses are a series of pipes or conduits which in the case of a base exchange water treatment apparatus comprise a pipe 27 connected to the water supply, a pipe 28 connected to the treatment tank adjacent the top thereof, a pipe 29 connected to the drain or other point of waste disposal, a pipe 30 connected to the treatment tank adjacent the bottom thereof, and a service pipe 31 connected to a point of use for the treated water. The boss 18 also has a bore 32 terminating at one end in the bore 23 and communicating therewith, the other end having internally threaded counterbores 33 and 34. An injector nozzle 35 is threaded into the counterbore 33 and a pipe plug 36 is threaded into the counterbore 34 so as to leave a space between the nozzle and the plug. A bore 37 digresses from the space or chamber 38 between the nozzle and plug and terminates on the inner surface of the walls 14 so as to communicate with the chamber 12. A further bore 39 intersects the bore 32 adjacent the nozzle and a counterbore 41 serves to receive a conduit or pipe 42 connected to a source of reagent supply such, for example, as a conventional brine or reagent tank. It will thus be seen that the bore 32 constitutes the diffuser tube of a conventional ejector so that when fluid flows through the port 37, the chamber 38, the nozzle 35 and the bore 32, reagent will be drawn through the pipe 42 and delivered into the port connection 23. If desired, a restriction plug 43 may be threaded into the threaded boss 19 to restrict the rate of flow through the drain pipe 29.

The inner surface 44 of the chamber wall 14 is, in the present embodiment, of cylindrical form, and forms the annular seating surface against which the valve core rests in the seated position thereof. The valve core comprises two sections or segments designated generally by the numerals 45 and 46. The core section 45 has an elongated port 47 therein defined by marginal walls 48 and 49 adapted to seat against the surface of the chamber above and below the plane of the chamber ports and end walls 51 and 52 defining the ends of the ports and arranged to seat against the annular surface of the chamber between the various port areas. A rod 53 extends across the chamber area and has its ends affixed in openings 54 and 55 in the core section 45, and surrounding this rod is a sleeve 56 having an eccentric bore for the reception of the rod 53, the sleeve having a set screw 57 adapted to bear against the rod. Links 58 and 59 are pivotally carried on the sleeve 56 adjacent its ends, these links each constituting one member of a pair of toggle mechanisms presently to be described.

The core section 46 has a port 61 in its annular face defined by upper and lower walls 62 and 63 and end walls 64 and 65, the section having a wall 66 at the rear of this port to segregate the port from the balance of the chamber when the core section 46 is seated. This core section has headed pins 67 and 68 adjacent opposite ends seated for rotational adjustment in suitable bores and counterbores, the pins having eccentric portions 69 and 71. The pins are secured in adjusted position by set screws 72 threaded into the core section and bearing against the heads of the pins. Links 73 and 74 are pivotally mounted on the eccentric portions and form the second links of the core toggle mechanism. The outer surfaces of the core sections 45 and 46 are covered with a layer of compressible material as indicated at 75 for sealing the contacting faces between the core and the annular wall 14 of the chamber. This material may suitably be a layer of rubber, leather, synthetic rubber such as neoprene or other soft gasket material which will serve to provide a seal in the contacting area.

The operating mechanism includes a valve shaft 76 extending axially through the valve chamber 12 and through the cap 16, the inner end of the shaft being journaled in a recess 77 formed on the bottom of the chamber. The shaft projects through the cap 16 and the cap is provided with a suitable stuffing box 78 for the purpose of preventing leakage from the valve along the shaft and for the purpose of providing bearing support for the shaft. The cap 16 has an upstanding boss 79 within which the stuffing box is located, the cap being attached to the body by a plurality of bolts 81 spaced around the cap and passing through the flange 15 of the body. A suitable gasket 82 may be provided to prevent leakage between the body and the cap. The recess 77 in the valve chamber serves to support and guide the inner end of the shaft, this recess being located in an upstanding boss 83 on the bottom of the chamber. For the purpose of defining the various angular positions of the shaft and the valve core, the boss 83 is provided with a plurality of radially disposed slots 84, 85 and 86, and the shaft 76 is provided with a protruding cylindrical pin 87 shaped for selective reception in any of these slots to guide the shaft to define seated positions by cam action of the sides of the pin against the edges of the slots. A cross arm 88 passes through the shaft 76 in the plane of the core and is provided with journals 89 and 90 at its ends for the pivotal reception of the inner ends of the core toggle links, the opposite ends of these links being mounted as heretofore described. It will thus be seen that the links 58 and 73 form with the journal 89 one toggle element, while the links 59 and 74 with the journal 90 form a second toggle element, the journals 89 and 90 forming the movable pivot of the toggle, this pivot being carried on the shaft 76. It will therefore be seen particularly from Figs. 2 and 4 that when the pin 87 rests within one of the recesses 84, 85 or 86 and the shaft is moved to its innermost position, the links 59 and 74 are disposed slightly past center viewing Fig. 4 so that any force exerted against the core sections tends to collapse the toggles in a direction to move the shaft downward, the extent of this downward movement being limited by the pin 87. In this position the core sections are seated against the inner surface of the wall 14 and are forced thereagainst by action of the core toggles.

Means are provided for moving the shaft 76 longitudinally and for rotating the shaft to change the position of the core sections. This means comprises a cross arm 91 passing through the shaft 76 in spaced relation to the cap 16. The outer end of this cross arm pivotally carries a pair of links 92, the opposite ends of these links being pivotally connected to pins 93 carried on offset portions 94 on the arms 95 of a handle designated generally by the numeral 96. The lower end of the arms 95 are pivotally mounted on pins 97 fixed in a slip ring 98 surrounding the boss 79 and retained thereon by a collar 99 threaded on the external surface of the boss. The handle has a pair of cross members 101 and 102, the cross member 102 being adapted to be grasped by the hand of the operator for manually moving the same between the positions shown in Figs. 3 and 5. The crossbar 101 has a slot 103 therein for the passage of the end of the shaft, as will be apparent from Figure 1.

When the parts occupy the seated service position as shown in Figs. 1, 2, 3 and 4, the arms 95 of the handle are in a vertically disposed position as shown in Fig. 3 and the links 92 are disposed in diagonal relationship. When the position of the valve core is to be changed, the handle is swung to the position shown in Fig. 5, bringing the links 92 to vertical position and raising the shaft 76 to the position shown in Figs. 5 and 7. At the inception of this movement the core sections are spread slightly until the core toggles pass over center. Thereafter raising of the shaft 76 collapses the toggles in an upward direction facing Fig. 7, thereby drawing the core sections inwardly as indicated in Fig. 6, pulling the sealing surface of the core sections away from the inner wall of the chamber. This longitudinal movement of the shaft 76 also raises the pin 87 out of the slot 84 so that the shaft is free to rotate. The handle is then revolved about the axis of the shaft 76, the shaft turning with the handle, or until the pin 87 can be moved into the next notch 85. At this position the handle 96 is returned from the position shown in Fig. 5 to that shown in Fig. 3, reseating the core sections. It will be seen that the links 58 and 59 are pivotally mounted on the eccentric sleeve 56 so that by rotation of this sleeve the toggle action of the links 58 and 59 may be adjusted. Likewise the pins 67 and 68 being rotatable permit of adjustment of the position of the eccentric portions 69 and 71 and of the links 73 and 74. Through these eccentric mountings the core toggles can be adjusted so that the pivot points 89 and 90 pass through the center line of the toggles at the proper point to apply proper pressure between the core sections and the walls of the chamber when the pin 87 reaches its seated position within the notches and to retain the core sections in seated position against compressive forces on the core sections.

Figure 2:
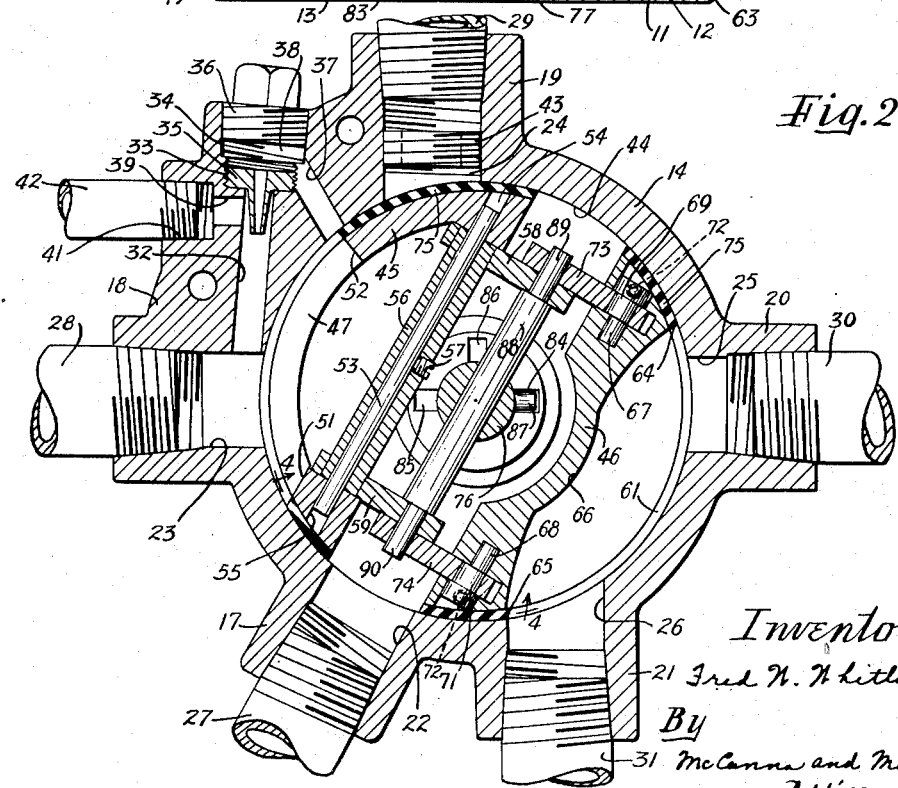
Fig. 2 is a longitudinal section on the line 2—2 of Figure 1.

In Fig. 2 the valve core is shown in the so-called service position in which untreated water enters the valve chamber through the pipe 27 passing through the space between the valve sections 45 and 46, past the sleeve 56 and out through the port 23 to the top of the treatment tank. The liquid from the bottom of the treatment tank returns to the valve through the port 25, passes through the core section port 61 and out to service through the body port 26. The port 24 to drain is closed by the core section 45.

Figure 8:
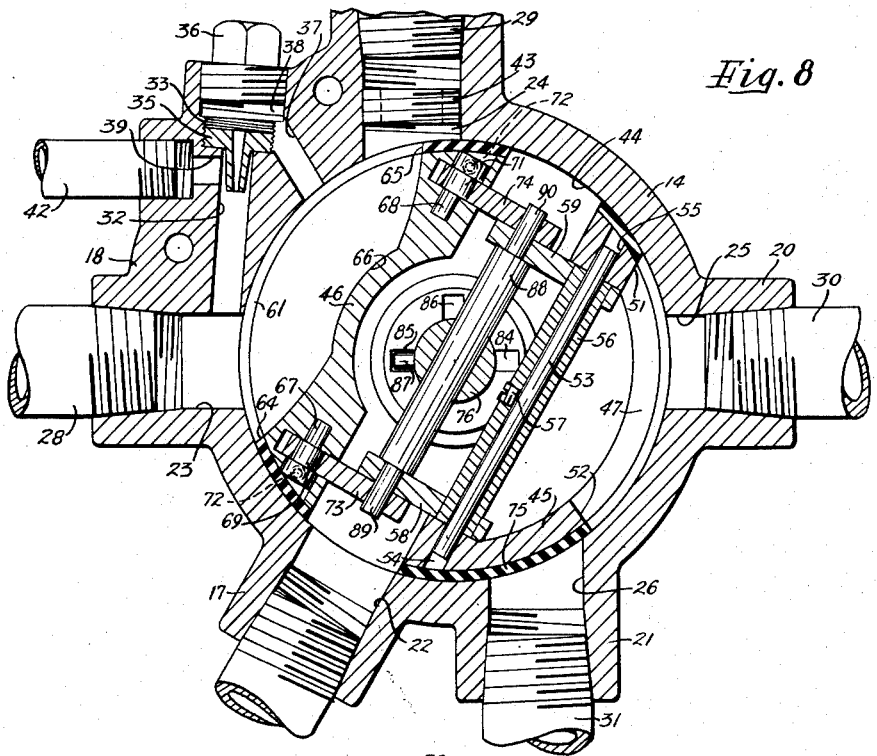
Figure 9:
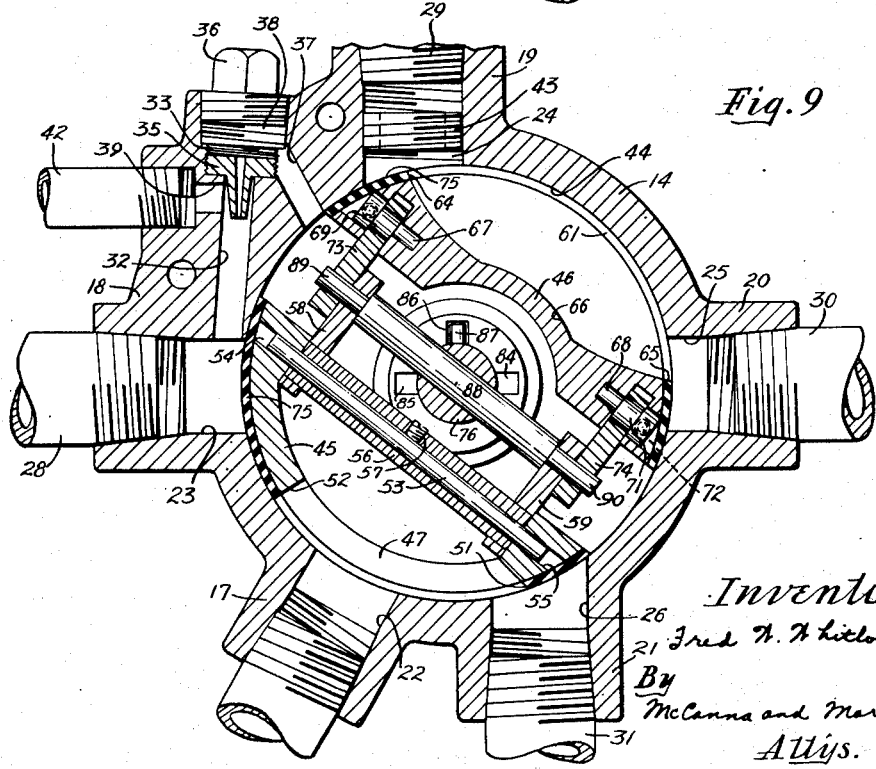

When the treatment device is in need of reconditioning the core is moved in the manner heretofore described to the position shown in Fig. 8, commonly called the backwash position, in which position untreated water enters the valve chamber through the inlet port 22, passes through the space between the core sections 45 and 46 and out through core port 47 and body port 25 to the bottom of the treatment tank, and from the top of the treatment tank flows through body port 23, the core port 61 and the body port 24 passing to drain through the pipe 29. In this position of the core the service port 26 is closed by the core section 45. When the bed of base exchange material has been cleaned by sufficient backwash flow, the valve core is moved to the regenerating position shown in Fig. 9, in which position untreated water enters the valve chamber through the body port 22, passes through the core port 47 and through the space between the core sections 45 and 46 to the bore 37, thence passing through the chamber 38 and nozzle 35 to the bore 32, thus drawing brine or other regenerating material inward through the pipe 42 and delivering the untreated water and regenerating reagent in a combined stream into the port 23 for passage through the pipe 28 to the top of the treatment tank. The valve section 45 prevents direct flow from the chamber through the port 23 in this position of the valve. The liquid is discharged from the bottom of the treatment tank, flowing through the body port 25, the core port 61 and the body port 24 out through pipe 29 to the drain. When a sufficient or required amount of regenerating solution has passed through the injector as measured by external means, flow through the reagent pipe 42 is terminated by an external valve and untreated water is allowed to continue to flow through the injector with the parts remaining in the position shown in Fig. 9 until such time as sufficient water has passed through the treatment tank to effectuate the necessary rinsing.

Among the numerous advantages of the valve construction is the fact that there are no springs necessary to its proper operation. Valves of this character are intended for long periods of continuous service, under which circumstance the corrosion of springs and the inherent change in the property of springs tend to shorten the life of a valve which is dependent on them for its proper operation. In this instance it will be seen that when the valve sections are moved to seated position as shown in Fig. 4, the toggle links positively prevent unseating of the valve. This toggle construction also prevents temporary unseating of the valve by surges in line pressure. Another advantage of the valve is the ease with which it may be shifted from position to position due to a relatively close balance in the pressures within the valve permitted by the mechanical construction which does not rely in any substantial particular upon the pressure for maintaining the parts in seated position. A still further advantage lies in the substantially greater flow rates which can be obtained through a valve of given size and to the fact that pressure losses in the valve are reduced to a minimum.

I claim:

1. The combination in a multiway valve of a valve case including a body having side walls defining a valve chamber, said body having a plurality of annularly spaced ports opening into the chamber, a valve core disposed in said chamber comprising at least two core sections adapted to seat against said side walls, each of said sections formed with a passage positioned to communicate with preselected ones of the body ports for the transfer of fluid between said body ports through said core passages in simultaneous segregated flows when the core is seated against the side walls, an operating shaft for said core, means in said chamber for moving said core sections toward each other and away from the body side walls toward an unseated position in response to movement of the shaft longitudinally in one direction and for forcing the core sections to a seated position against the side walls in response to movement of the shaft longitudinally in the opposite direction, and means outside the chamber for moving the shaft longitudinally to unseat and seat the core and for rotating the shaft when the core is unseated to rotate the core between a plurality of operating positions.

2. The combination in a multiway valve of a valve case including a body having side walls defining a valve chamber, said body having at least four annularly spaced ports opening into the chamber, a valve core disposed in said chamber comprising at least two ported core sections shaped to seat against said side walls, each of said sections being formed with a passage positioned to communicate with preselected different body ports when the core is seated against the side walls for the transfer of fluid between the body ports in simultaneous segregated flows through said core passages in preselected different rotative locations of the core when the latter is seated, an operating shaft for said core, means in said chamber connecting said core sections to said shaft for moving said core sections toward each other and away from the body side walls toward an unseated position in response to movement of the shaft longitudinally in one direction and for forcing the core sections to a seated position against the side walls in response to movement of the shaft longitudinally in the opposite direction, means outside the chamber for moving the shaft longitudinally to unseat and seat the core and for rotating the shaft when the core is unseated to rotate the core between a plurality of operating positions, and means in the chamber operative between the shaft and the body for locating the core in each of said preselected locations.

3. The combination in a multi-way valve of a valve case including a body having walls defining a valve chamber, said body having a plurality of annularly spaced ports opening into the chamber, a valve core disposed in the chamber comprising at least two spaced sections each having outer surfaces shaped to seat against the side walls, each of said sections being chambered and ported for passage of liquid therethrough between various of the body ports in independent segregated flows in different seated rotative locations of the core, an operating shaft for said core, an overcenter mechanism in said chamber connecting said core sections with said shaft for moving the core sections toward each other to an unseated position out of contact with the body walls upon movement of the shaft longitudinally in one direction and for forcing the core sections to a seated position against the walls in response to movement of the shaft longitudinally in the opposite direction to an overcenter location of said mechanism, sealing means disposed between the walls and the core for sealing the interface between the walls and the core, and operating means outside the chamber for moving the shaft longitudinally to unseat the core, rotating the shaft to turn the core between preselected rotative position and moving the shaft longitudinally in the opposite direction to reseat the core.

4. The combination in a multiway valve of a valve casing including a body having walls defining a valve chamber, said body having a plurality of annularly spaced ports opening into the chamber, a valve core disposed in the chamber comprising at least two spaced sections each having outer surfaces shaped to seat against the walls, each of said sections being chambered and ported for passage of liquid therethrough between various of the body ports in simultaneous segregated flows in different seated rotative locations of the core, an operating shaft for said core, an overcenter mechanism in said chamber connecting said core sections with said shaft for moving the core sections toward each other to an unseated position and out of contact with the body walls upon movement of the shaft longitudinally in one direction and for forcing the core sections to a seated position against the walls in response to movement of the shaft longitudinally in the opposite direction to an overcenter location of said mechanism, sealing means disposed between the walls and the core for sealing the interface between the walls and the core, operating means outside the chamber for moving the shaft longitudinally to unseat the core, rotating the shaft to turn the core between preselected rotative positions and moving the shaft longitudinally in the opposite direction in each rotative location to reseat the core, and means within the chamber acting between the shaft and the valve case for preventing the core from being seated in other than preselected rotative locations with respect to the body to provide a preselected cycle of liquid flows through the valve.

5. The combination in a multiway valve of a valve case including a body having side walls defining a valve chamber, said side walls having a seating face concentric with a central axis through the chamber and having at least three annularly spaced body ports opening into the chamber, a valve core disposed in the chamber rotatable between at least four preselected positions and comprising core sections shaped to seat against said seating face in each of said preselected core positions, each of the sections being formed with a passage positioned to effect communication between pairs of different body ports for the transfer of fluid in simultaneous segregated flows between the ports of each pair through said core passages in each of the seated positions of the core, an operating shaft on said central axis, means in said chamber connecting the core sections to the shaft operative in each of said preselected positions of the core to move the core sections between a seated operating position pressed against the seating surface and a withdrawn unseated position for free rotation of said core between said preselected positions in response to longitudinal movement of the shaft in opposite directions, operating means outside the chamber for moving the shaft longitudinally in one direction to unseat the core, for turning the shaft to rotate the core between a plurality of operating positions, and for moving the shaft longitudinally in the opposite direction to reseat the core.

6. The combination in a multiway valve of a valve case comprising a body having a valve chamber and an annular seating surface, the casing having at least four annularly spaced ports communicating with the chamber and a valve cap enclosing said chamber, a valve core disposed in said chamber comprising core sections each having an outer surface shaped to seat against said seating surface and each formed with a separate passage positioned to effect communication between preselected ones of the body ports for the transfer of fluid between said body ports through the core passages when the core is seated against said seating surface, at least one of said sections having a wall segregating a portion of the chamber in the seated positions of the core to provide simultaneous segregated flows through the core in different rotative locations of the core when the latter is seated, sealing means compressible between the body and the core to prevent cross flow between the body ports, means within the chamber for expanding and contracting the core to move said core sections with a radial component between an expanded seated position to establish segregated communication between various of the body ports and an unseated position for rotation of the core, and operating means on the exterior of the case projecting into the chamber for operating the last mentioned means and for rotating the core to establish a succession of port connections.

7. The combination in a multiway valve of a valve case comprising a body having a valve chamber and an annular seating surface, said case having at least four annularly spaced ports communicating with the chamber and a valve cap enclosing said chamber, a valve core disposed in said chamber comprising core sections having outer surfaces shaped to seat against said seating surface and formed with separate passages positioned to effect communication with preselected ones of the body ports when the core is seated for the transfer of fluid between said body ports through said core passages, one of said sections having a wall for dividing said chamber into two portions in the seated positions of the core to provide two simultaneous segregated flows through the chamber in different rotative locations of the core, sealing means on each of the core sections surrounding the passages thereof to seat against said seating surface and seal the contacting faces around the passages, means within the chamber for expanding and contracting the core at each rotative location of the core to move said core sections with a radial component between an expanded seated position to establish segregated communication between various of the body ports and an unseated position for free rotation of the core, and operating means on the exterior of the case projecting into the chamber for operating the last mentioned means and for rotating the core to establish a succession of port connections.

8. The combination in a multiway valve of a valve case including a body having a valve chamber providing an annular seating surface, said seating surface having annularly spaced ports therein communicating with the chamber, a valve core disposed in the chamber comprising core sections having outer surfaces shaped to seat against said seating surface and formed with separate passages positioned to effect communication between preselected ones of the body ports when the core is seated for the transfer of fluid between said body ports through said core passages in simultaneous segregated flows in preselected different seated rotative positions of the core, an operating shaft for said core centrally disposed in said chamber having bearing support on opposite sides thereof and extending to a point outside the case, means within the chamber between the shaft and the core sections for moving the core sections upon longitudinal movement of the shaft in opposite directions, between expanded seated positions to establish segregated communication between various of the body ports and an unseated position for rotation of the core, and cam means within the chamber disposed between the shaft and the case for preventing seating movement of the shaft in other than said preselected core positions.

9. The combination in a multiway valve of a valve case including a body having a valve chamber providing an annular seating surface having annularly spaced ports therein communicating with the chamber, a valve core disposed in the chamber comprising relatively movable core sections, each of said sections being chambered and ported for passage of liquid therethrough between various of the body ports in simultaneous segregated flows in different seated rotative positions of the core, an operating shaft for said core, toggle mechanism in the chamber connecting each of the core sections with the shaft for moving the core sections toward each other to an unseated position out of engagement with said seating surface upon movement of the shaft longitudinally in one direction and for forcing the core sections to a seated position engaging the seating surface in response to longitudinal movement of the shaft in the opposite direction to an overcenter location of said mechanism, means for adjusting the toggle mechanism to bring the core sections into engagement with said seating surface at a preselected position of the toggle mechanism, sealing means disposed between the body and the core sections to provide a seal between the seating surface of the body and the core, and operating means outside the chamber for moving the shaft longitudinally to unseat the core, rotating the shaft to turn the core between preselected rotative position and moving the shaft longitudinally in the opposite direction to reseat the core.

10. The combination in a multiway valve of a valve case including a body having a valve chamber providing an annular seating surface having annularly spaced ports therein communicating with the chamber, a valve core disposed in the chamber comprising relatively movable core sections, each of said sections being chambered and ported for passage of liquid therethrough between various of the body ports in simultaneous segregated flows in different seated rotative positions of the core, compressible sealing means disposed between the body and the core sections to provide a seal between the seating surface of the body and the core, an operating shaft for said core, toggle mechanism in the chamber connecting each of the core sections with the shaft for moving the core sections toward each other to an unseated position upon movement of the shaft longitudinally in one direction and for forcing the core sections to a seated position engaging the seating surface in response to longitudinal movement of the shaft in the opposite direction to a preselected degree and for moving the toggle mechanism through center upon continued movement of the shaft in said opposite direction and thereby lock the core against unseating movement, stop means for limiting the movement of the toggle mechanism in said one direction, means for adjusting the toggle mechanism to bring the core sections into engagement with said seating surface at a preselected position of the toggle mechanism, and operating means outside the chamber for moving the shaft longitudinally to unseat the core, rotating the shaft to turn the core between preselected rotative position and moving the shaft longitudinally in the opposite direction to reseat the core.

11. The combination in a multiway valve of a valve case including a body having a valve chamber providing an annular seating surface having annularly spaced ports therein communicating with the chamber, a valve core disposed in the chamber comprising two spaced core sections, said core being chambered and ported for passage of liquid therethrough between various of the body ports in simultaneous segregated flows in different seated rotative positions of the core, sealing means between the body and the core, an operating shaft for said core, toggle mechanism in the chamber comprising toggle links pivoted on said core sections and each having pivotal connection with said shaft for movement thereby through center, means outside the case for moving the shaft longitudinally in one direction thereby collapsing the toggle mechanism to move the core sections toward each other to an unseated position out of engagement with the seating surface and for moving the shaft longitudinally in the opposite direction thereby moving the toggle mechanism through center to first move the core sections to a position engaging the seating surface and thereafter compress said sealing means between the seating surface and the case and lock the core in the seated position thereof.

12. The combination in a multiway valve of a valve case including a body having a valve chamber and annularly spaced ports communicating with the chamber, a valve shaft disposed in part in the chamber and extending to a point outside the case, a slip ring on the exterior of the case surrounding the shaft and concentric therewith, a handle pivoted on the slip ring on an axis transverse to the shaft and spanning the ring, toggle means disposed between the handle and the shaft for moving the latter longitudinally upon rotation of the handle on the transverse axis and for rotating the shaft upon rotation of the handle and slip ring, a valve core in said chamber movable between expanded seated position against the chamber walls and a contracted unseated position, and means in the chamber between the shaft and the core for expanding and contracting the core in response to longitudinal movement of the shaft in opposite directions and for turning the core with the shaft when the core is contracted.

13. The combination in a multiway valve of a valve case having a valve chamber and annularly spaced ports communicating with the chamber, a valve shaft disposed in said chamber and extending through the case, a slip ring on the case surrounding the shaft and concentric therewith, a handle spanning the slip ring having arms pivotally connected thereto at diametrically opposed points for rotation thereon on an axis transverse to the shaft, a cross pin disposed on said shaft, toggle links connecting the arms of the handle to the cross pin for moving the shaft longitudinally upon rotation of the handle on said transverse axis and for rotation of the shaft upon rotation of the handle and slip ring, a valve core in said chamber movable between expanded seated positions against the walls of the chamber and a contracted unseated position, and means in the chamber between the shaft and the core for expanding and contracting the core in response to longitudinal movement of the shaft in opposite directions and for turning the core with the shaft when the core is contracted.

FRED W. WHITLOCK.

REFERENCES CITED

The following references are of record in the file of this patent:

UNITED STATES PATENTS

| Number | Name | Date |
| --- | --- | --- |
| 1,639,743 | Marscheider | Aug. 23, 1927 |
| 1,673,103 | Cochin | June 12, 1928 |
| 2,027,108 | Kuehling | Jan. 7, 1936 |
| 2,169,525 | Goldberg | Aug. 15, 1939 |
| 2,215,853 | McNeal | Sept. 24, 1940 |
| 2,388,268 | Kromhout | Nov. 6, 1945 |

FOREIGN PATENTS

| Number | Country | Date |
| --- | --- | --- |
| 685,632 | France | Apr. 1, 1930 |